United States Patent
Abramowski et al.

[19]

[11] Patent Number: 5,949,855
[45] Date of Patent: *Sep. 7, 1999

[54] COMMUNICATION SYSTEM

[75] Inventors: Stephan Abramowski; Martin Elixmann, both of Aachen; Jochen Fischer, Roth; Holger Gappisch, Aachen; Axel Kehne, Aachen; Karin Klabunde, Aachen; Ursula Konrads, Aachen, all of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/752,828

[22] Filed: Nov. 20, 1996

Related U.S. Application Data

[63] Continuation of application No. 08/322,047, Oct. 12, 1994, abandoned.

[30] Foreign Application Priority Data

Oct. 16, 1993 [DE] Germany .................. 43 35 396

[51] Int. Cl.[6] ...................................... H04M 1/64
[52] U.S. Cl. ................... 379/88.25; 379/88.01; 379/211
[58] Field of Search .................. 379/67, 88, 89, 379/201, 207, 211, 212, 269, 88.01, 88.02, 88.22, 88.24, 88.25, 243, 245

[56] References Cited

U.S. PATENT DOCUMENTS

| | | | |
|---|---|---|---|
| 4,191,860 | 3/1980 | Weber | 379/230 |
| 5,023,868 | 6/1991 | Davidson et al. | 379/88 |
| 5,418,844 | 5/1995 | Morrisey et al. | 379/207 |
| 5,430,791 | 7/1995 | Feit et al. | 379/67 |

FOREIGN PATENT DOCUMENTS 9211724  9/1992  WIPO .

Primary Examiner—Fan S. Tsang
Attorney, Agent, or Firm—Steven R. Biren

[57] ABSTRACT

A communication system comprises a communications network coupled at least to a terminal unit. The communications network is coupled to a service device which comprises a switching center, a controller, and a data bank. The data bank contains at least a service logical program. A terminal unit generates a first parameter and a second parameter for sending as a single transmission to the service device. The controller extracts a service logical program from the data bank in response to the first parameter. The controller further controls the switching center in response to the second parameter based on the extracted service logical program.

6 Claims, 1 Drawing Sheet

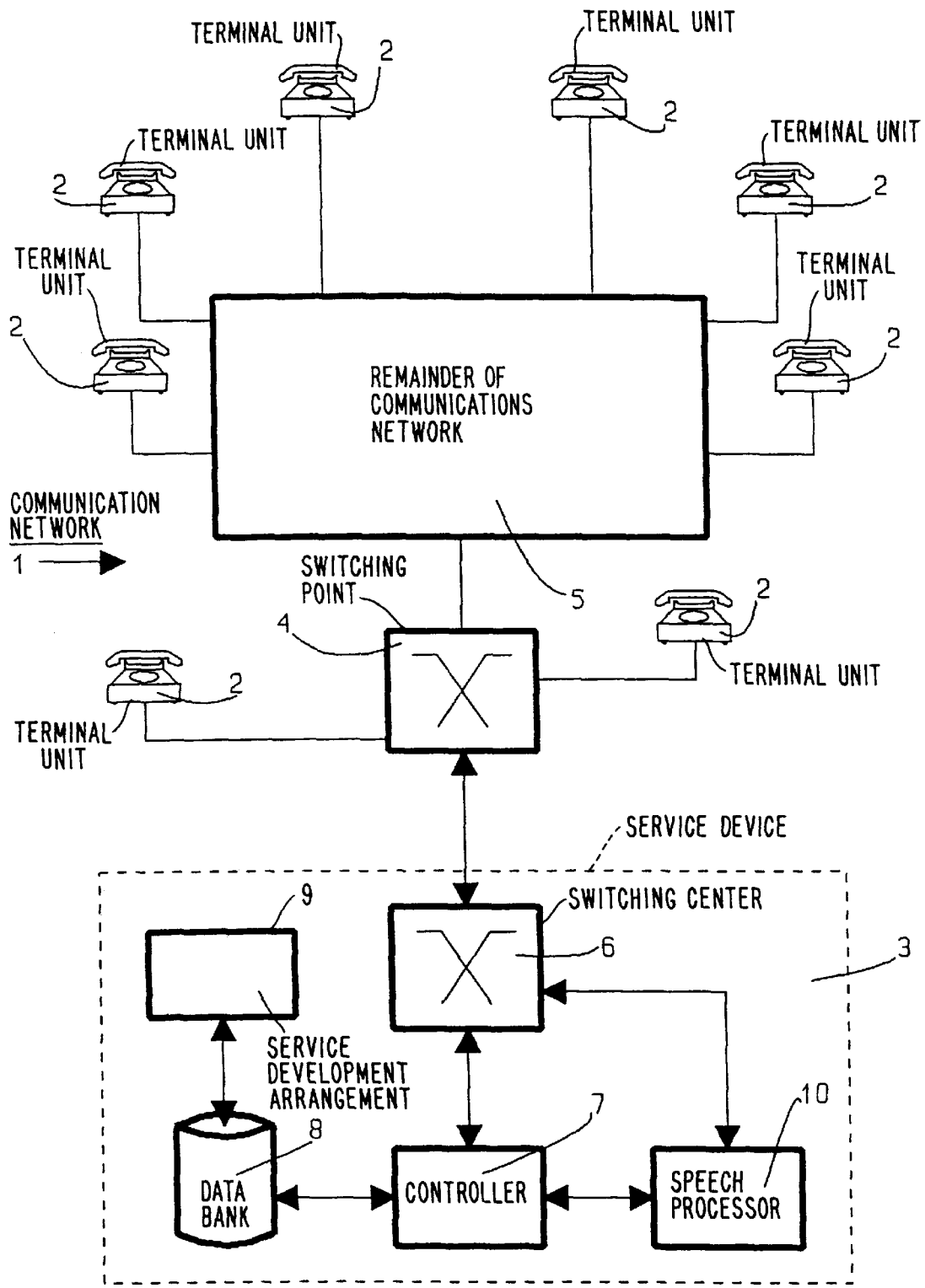

COMMUNICATION SYSTEM

This is a continuation division of application Ser. No. 08/322,047, filed Dec. 10, 1994, now abandoned.

BACKGROUND OF THE INVENTION

1. Field of the Invention

The invention relates to a communication system comprising a communications network coupled at least to a terminal unit.

2. Discussion of the Related Art

From WO 92/11724 or the number about this subject of the journal net—Zeitschrift für angewandte Telekommunikation", Net Special Mar. 12, 1993, pp. 8 to 18, is known a communication system which comprises a communications network (switched telephone network, service control point) with a plurality of switching points and terminal units coupled thereto. Certain switching points included in the communications network are used, on the one hand, to switch functions to several terminal units (for example, telephone traffic) or further switching points and, on the other hand, to switch over to a further network (overlay network) which provides special services. A service of the German Postal Service Telekom is, for example, the private information service Tele-Info-Service.

If a subscriber dials a special service number (for example, 0190 . . . ), this number designates a switching point (service switching point) which establishes an appropriate connection to the further network provided for services. Specific switching points not only switch through telephone connections, as they normally do, but also process calls and switch them through to the service-processing network. To this end such a switching point is more extensive, compared with a switching point provided only for telephone traffic, and thus the communication network is modified.

SUMMARY OF THE INVENTION

It is an object of the invention to provide a communication system in which a service is made available without a modification of the communications network.

The object is achieved by a communication system of the type defined in the opening paragraph, in that the communications network is coupled to a service device which comprises a switching centre, a controller and a data bank which contains at least a service logical program, in that a terminal unit is provided for generating a first and a second parameter sent to the service device, and in that the controller is provided for extracting a service logical program from the data bank in response to the first parameter and for controlling the switching centre in response to the second parameter and the called service logical program.

In the communication system according to the invention a service device is coupled to the communications network, which service device renders at least one service available. The service device comprises a controller which evaluates received parameters. The parameters may be generated, for example, by a terminal unit by entering dial digits and be sent to the service device. For this purpose, the subscriber is first to enter the directory number of the service device and, subsequently, further dial digits. The controller interprets the digits appended to, the directory number of the service device as parameters (i.e., the directory number, a first parameter and a second parameter are sent as a single transmission). A first group of dial digits then forms a first parameter which stands for a certain service. The controller then extracts (i.e., selects) from a data bank located in the service device the service logical program necessary for controlling that service.

In the service device there is further a switching centre which is controlled by the controller in response to a second parameter which has been transmitted by the terminal unit. The second parameter may be, for example, a group of dial digits which are appended to the group of dial digits for the first parameter (i.e., the group of dial digits for the second parameter and the group of dial digits for the first parameter are sent to the service device as a single transmission). The second parameter is evaluated by the controller by means of the service logical program and after that a corresponding control instruction is applied to the switching centre.

The service device may be, for example, a connection between the terminal unit calling the service and another terminal unit to be called. The controller then evaluates the received dial digits and selects the terminal unit to be called. Once the connection has been set up, the call is put through between the switching centre and the calling terminal unit.

A terminal unit may be, for example, a telephone set, a personal computer or a workstation. From such a terminal unit not only numerical digits are transmitted, but also letters and special characters.

If the communications network is an integrated services digital network (ISDN), it is also possible for a switching point to send the parameters to the service device when the terminal unit generates the parameters (for example, the receiver is lifted). The switching point then first establishes a connection to the service device and then sends the parameters.

As a result of the coupling of the service device to the communications network, a service may be rendered available without the need for a modification of the communications network.

The controller is thus used for extracting (i.e., selecting) the service logical program addressed by the first parameter, for interpreting the service logical program and for generating a control instruction for the switching point in response to the second parameter. The switching point is used for conveying the received first and second parameters to the controller and, in response to a control instruction, for carrying out a switching function.

For designing and testing new services, a service development arrangement is incorporated in the service device. Once a service logical program has been developed, this service logical program is sent to the data bank to be stored there. The controller can then extract such a service logical program from the data bank in response to a subscriber's call via a terminal unit.

Furthermore, the service device comprises a speech processor which receives a control instruction from the controller at least in response to the second parameter, is provided for speech recognition of a message supplied via the switching centre, is provided for conveying the recognized message as a third parameter to the controller, and is provided for producing a prompt conveyed by the switching centre.

The speech processor applies prompts to, for example, a terminal unit or carries out a speech recognition operation of a subscriber's prompts which have been applied to the service device by the terminal unit via the communications network. The recognized prompt is applied to the controller as a third parameter, which controller subsequently produces a control instruction for the speech device and/or the switching centre in response to this third parameter.

The invention likewise relates to a service device which is coupled to at least a terminal unit via a communications network and which comprises a switching centre, a data bank containing at least a service logical program, and a controller which controller is arranged for extracting a service logical program from the data bank in response to a first parameter sent by a terminal unit and for controlling the switching centre in response to a second parameter sent by the terminal unit and in response to the called service logical program.

BRIEF DESCRIPTION OF THE DRAWINGS

An embodiment of the invention will be further explained hereinafter with reference to FIG. 1 which shows a communication system.

DETAILED DESCRIPTION OF THE PREFERRED EMBODIMENTS

The communication system shown in FIG. 1 comprises a communications network 1, several terminal units 2 and a service device 3. In FIG. 1 a switching point 4 of the communications network 1 to which the service device 3 is coupled is shown as an example. The rest of the communications network 1 is shown as a block referenced 5.

The service device 3 comprises a switching centre 6, a controller 7, a data bank 8, a service development arrangement 9 and a speech processor 10. The switching centre 6 of the service device 3 is coupled to the switching point 4 of the communications network 1. The switching centre 6 is further connected to the speech processor 10 and to the controller 7. There is also a connection between the controller 7 and the speech processor 10. An additional data bank, in which service logical programs are stored, is connected to the controller 7.

If a connection is to be established between a terminal unit 2 and the service device 3, the service device is to be dialled from the terminal unit 2. For example, a connection to the switching point 4 is switched through in that the area code digits (for example "0123") are entered by the terminal unit and the connection to the service device 3 is switched through in that further dial digits (for example, "67") are entered. In order that the user can call a service in the service device 3, further dial digits (for example, "999") are to be entered in the terminal unit 2. These dialling digits form a first parameter. The switching centre 6 conveys the received characters to the controller 7 which forms a first parameter from the characters. Subsequently, the controller 7 extracts the service logical program addressed by the first parameter from the data bank 8. Further characters (for example, dialling digits "12") received by the switching centre 6 and sent to the controller 7 are identified as the second parameter by the controller. The second parameter is interpreted as an entry for the service logical program. The controller then gives a control instruction to the switching centre 6 and/or to the speech processor 10 in response to second parameters processed in the service logical program. For example, the switching centre 6 is to establish a connection to a further terminal unit 2 after the centre has received a control instruction. The speech processor 10 can generate a prompt, for example, after the control instruction has been received, which prompt is conveyed, via the switching centre 6, to the subscriber calling the service, or recognize prompts which are expected by the calling subscriber and transfer them as a third parameter for the service logical program of the controller 7. This third parameter is then processed by the service logical program after which a further control instruction is generated.

Furthermore, the service development arrangement 9 connected to the data bank with which arrangement a new service can be developed, tested and modified. New or modified services are transferred to the data bank 8 after they have been worked on by the service development arrangement 9, which data bank stores the new or modified service.

For a further understanding of the invention two embodiments for service logical programs will be explained in the following.

EXAMPLE 1

Have the digits "01800" been dialled?
Yes: Service 1 is extracted from the data bank;
  Have the digits "0225" been dialled after that?
  No: Control instruction to the speech processor 10:
    Prompt "Number cannot be interpreted";
  Yes: 01.11.1993 ≦ date ≦ 19.11.1993 and
    8.00 hours ≦ time of day ≦ 19.00 hours?
      Yes: Control instruction to the switching centre 6:
        connect to "040 34870";
      No: What day of the week is it?
        Saturday and Sunday:
        Control instruction to the speech processor
        10: Prompt "Office is closed";
        Monday or Friday:
        What time of day is it?
          7.00 hours till 16.30 hours;
          Control instruction to the switching centre 6: Connect to
          "0241 155254";
          16.31 hours till 22.00 hours:
          Control instruction to the switching centre 6: Connect to "040
          3279",
Otherwise:
Control instruction to the speech processor 10:
Prompt "Office is closed".

If the controller 7 has received the digits "01800" (first parameter) from the switching centre 6, the service 1 is extracted from the data bank 8 which sets up connections or transfers messages in dependence on the date, the time of day and possibly the day of the week. Then the controller 7 verifies what digits are to be entered next by the subscriber of the terminal unit. If not the digits "0225" (second parameter) have been entered, the controller 7 sends out a control instruction to the speech processor 10 that the speech processor is to generate the prompt "Number cannot be interpreted". The switching centre 6 transfers this prompt to the communications network 1. In the other case there is verified what date, time of day and possibly, what day of the week it is.

If the call is made from the terminal unit 2 to the service device 3 between 1.11 and 19.11.1993 between 8.00 hours and 19.00 hours, the controller 7 applies a control instruction to the switching centre 6 that a connection is to be set up with the terminal unit 2 having the directory number "040 34870". Then there is established what day of the week it is. On a Saturday or Sunday the speech processor 10 is supplied with the control instruction that the prompt "office is closed" is to be generated. If the call to the service device 3 is made on a Monday to Friday, the time of day is asked. Between 7.00 hours and 16.30 hours the controller 7 sends out a control instruction to the switching centre 6 that a connection is to be set up with the terminal unit having the directory number "0241 155254". If the call has been made to the service device 3 between 16.31 hours and 22.00 hours, the switching centre 6 tries to set up a connection with the terminal unit that has the directory number "040 3279". In all further cases a control instruction is given by the controller 7 to the speech processor 10. The control instruction causes the speech processor 10 to generate the prompt "Office is closed".

EXAMPLE 2

---
Have digits "60099" been dialled?
Yes: Service 2 is extracted from the data bank;
   What further digits have been dialled?
   Digits "11":
      Control instruction to the switching centre 6:
      Connect to "0221 15632";
   Digits "12":
      Control instruction to the switching centre 6:
      Connect to "02251 98732";
   Digits "13":
      Control instruction to the switching centre 6:
      Connect to "080 171240";
   Otherwise:
   Control instruction to the speech processor 10: Prompt
   "Number cannot be interpreted".
---

Once the digits "60099" (first parameter) have been received by the switching centre 6, the controller 7 extracts the service 2 from the data bank 8 which service sends, in dependence on the digits of the second parameter, a control instruction to the switching centre 6 to establish a connection to a specific terminal unit. If the second parameter consists of the digits "11", a connection is made with the terminal unit having the directory number "0221 15632". If the digits "12" are dialled (second parameter), a connection to the terminal unit having the directory number "02251 98732" is established and if the digits "11" are dialled, a connection with the terminal unit having the directory number "080 017240" is established. In all further cases the speech processor produces the prompt "Number cannot interpreted" after a control instruction has been received from the controller 7.

What is claimed:

1. A communication system comprising:
    a terminal unit;
    a communications network coupled to the terminal unit and having a switching point having only a normal telephone function of switching through telephone connections; and
    a service device, which is a terminal unit for the switching point, and which is coupled to the switching point of said communications network on a one-to-one basis without modification of the communications network, said service device including a switching center, a controller and a data bank, the data bank including at least one service logical program for rendering a service;
    said first-recited terminal unit being adapted to generate a first parameter and a second parameter which are sent as a single transmission to said service device; and
    said controller being adapted to (i) in response to the first parameter, select from the data bank a service logical program which is relevant to the first parameter, and (ii) in response to the second parameter, control the switching center in accordance with the selected service logical program as applied to the second parameter.

2. The communication system claimed in claim 1 wherein:
    said controller treats the second parameter as an entry in the selected service logical program, and generates a control instruction for controlling the switching center in accordance with the selected service logical program as modified by the second parameter; and
    the switching center is adapted to (a) convey the first parameter and second parameter, as received from said terminal unit via said communications network, to said controller, and (b) carry out a switching function in response to the control instruction generated by said controller.

3. The communication system claimed in claim 1, wherein said service device contains a service development arrangement for developing a service logical program and for feeding a developed service logical program to the data bank.

4. The communication system claimed in claim 1, wherein said service device further comprises a speech processor which includes:
    means for receiving a control instruction from the controller at least in response to the second parameter,
    means for providing speech recognition of a message supplied via the switching center;
    means for conveying the recognized message as a third parameter to the controller, and
    means for producing a prompt to be conveyed by the switching center to said terminal unit.

5. The communication system claimed in claim 4, wherein said controller receives the third parameter from the speech processor and produces a control instruction for the switching center and/or the speech processor in dependence on the third parameter.

6. A service device adapted to be coupled via a communications network to a terminal unit, said service device, which is a terminal unit for a switching point of said network, and which is coupled to the switching point on a one-to-one basis without modification of said network, comprising:
    a switching center;
    a data bank containing at least one service logical program for rendering a service; and
    a controller which (i) in response to a first parameter, sent by the first-recited terminal unit selects a service logical program from said data bank, and (ii) in response to a second parameter sent by the first-recited terminal unit controls the switching center in accordance with the second parameter as applied to the selected service logical program;
    the first parameter and second parameter being sent by said first-recited terminal unit as a single combined transmission.

* * * * *